(12) United States Patent
Ma et al.

(10) Patent No.: US 11,304,161 B2
(45) Date of Patent: Apr. 12, 2022

(54) SYSTEMS AND METHODS FOR SYNCHRONIZING MULTIPLE CONTROL DEVICES WITH A MOVABLE OBJECT

(71) Applicant: SZ DJI TECHNOLOGY CO., LTD, Shenzhen (CN)

(72) Inventors: Ning Ma, Shenzhen (CN); Xiongbin Rao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/663,974

(22) Filed: Oct. 25, 2019

(65) Prior Publication Data

US 2020/0068516 A1   Feb. 27, 2020

Related U.S. Application Data

(63) Continuation of application No. PCT/CN2017/111702, filed on Nov. 17, 2017.

(51) Int. Cl.
*H04W 72/00* (2009.01)
*H04W 56/00* (2009.01)
(Continued)

(52) U.S. Cl.
CPC ....... *H04W 56/0015* (2013.01); *B64C 39/024* (2013.01); *G05D 1/0016* (2013.01);
(Continued)

(58) Field of Classification Search
CPC .......... H04W 56/0015; H04W 72/005; H04W 56/001; B64C 39/024; B64C 2201/127; B64C 2201/146; G05D 1/0016; G05D 1/0038; G05D 1/0094; G08C 17/02; G08C 2201/93; G08C 2201/20; B64D 47/08

See application file for complete search history.

(56) References Cited

U.S. PATENT DOCUMENTS

| 10,178,635 B1* | 1/2019 | Bijwe | H04W 52/0216 |
| 2008/0170690 A1* | 7/2008 | Tysowski | H04W 12/033 380/270 |

(Continued)

FOREIGN PATENT DOCUMENTS

| CN | 103813194 A | 5/2014 |
| CN | 105261189 A | 1/2016 |

(Continued)

OTHER PUBLICATIONS

International Search Report from the State Intellectual Property Office of the P.R. China for International Application No. PCT/CN2017/111702, dated Aug. 8, 2018 (4 pages).

*Primary Examiner* — Lakeram Jangbahadur
(74) *Attorney, Agent, or Firm* — Finnegan, Henderson, Farabow, Garrett & Dunner, LLP

(57) ABSTRACT

Systems and methods for synchronizing communications between a movable object and first and second control devices are provided. In some exemplary implementations, the systems and methods may synchronize the first control device with the movable object, synchronize the second control device with the first control device, and synchronize the second control device with the movable object based on the synchronization between the second control device and the first control device.

12 Claims, 9 Drawing Sheets

(51) Int. Cl.
  *B64C 39/02* (2006.01)
  *G05D 1/00* (2006.01)
  *G08C 17/02* (2006.01)
(52) U.S. Cl.
  CPC ......... *G05D 1/0038* (2013.01); *G05D 1/0094* (2013.01); *G08C 17/02* (2013.01); *H04W 72/005* (2013.01); *B64C 2201/127* (2013.01); *B64C 2201/146* (2013.01); *G08C 2201/93* (2013.01)

(56) References Cited

U.S. PATENT DOCUMENTS

| | | | | |
|---|---|---|---|---|
| 2011/0075748 A1* | 3/2011 | Novak | ................ | H04L 27/2613 375/260 |
| 2014/0321452 A1* | 10/2014 | Choi | ................ | H04W 74/0833 370/350 |
| 2018/0324729 A1* | 11/2018 | Hou | ................ | H04L 29/08 |

FOREIGN PATENT DOCUMENTS

| | | | | |
|---|---|---|---|---|
| CN | 106686521 A | | 5/2017 | |
| CN | 206431490 U | * | 8/2017 | ............ H04W 56/00 |
| CN | 206431490 U | | 8/2017 | |
| CN | 107195167 A | | 9/2017 | |

\* cited by examiner

SYSTEMS AND METHODS FOR SYNCHRONIZING MULTIPLE CONTROL DEVICES WITH A MOVABLE OBJECT

CROSS-REFERENCE TO RELATED PATENT APPLICATIONS

This application is a continuation application of International Application No. PCT/CN2017/111702, filed Nov. 17, 2017, entitled "Systems and Methods for Synchronizing Multiple Control Devices with a Movable Object," which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to communication technology and, more particularly, to methods and systems for synchronizing multiple control devices with a moving object.

BACKGROUND

Moving objects, such as unmanned aerial vehicles ("UAV") (sometimes referred to as "drones"), include pilotless aircraft of various sizes and configurations that can be remotely operated by a user and/or programmed for automated flight. To fully or partially operate a UAV by off-board personnel, devices for controlling and communicating with the UAV used by the off-board personnel need to synchronize with the UAV to control various aspects of flight and/or other associated tasks (e.g., controlling cargo, operating imaging equipment, etc.). In many applications, only one device (e.g., a remote control) is used to operate a UAV, and a point-to-point communication is established between the device and the UAV. In this scenario, either the device or the UAV transmits a synchronization signal, such as a pilot sequence, which the other device uses to synchronize, for example, to achieve frame timing synchronization and carrier synchronization. The pilot sequence may comprise a known pattern of data or other information that can be detected within a signal for purposes of performing synchronization. In this context, frame timing synchronization may refer to synchronizing the transmission or reception of a sequence of data frames; carrier synchronization may refer to synchronizing the transmission or reception of information over a carrier frequency. With new applications emerging, however, point-to-multipoint communications may be required, such as between the UAV and multiple remote controls, or between the UAV and a remote control and a smart eyeglass for example. Accordingly, how to synchronize a UAV and multiple devices in a point-to-multipoint communication system may become desirable.

Previous approaches for such point-to-multipoint communications have employed a direct expansion of point-to-point synchronization. For example, the UAV broadcasts a synchronization sequence, multiple control devices (e.g., two remote controls) listen and monitor the broadcast synchronization sequence concurrently to separately achieve synchronization between the UAV and each control device. However, due to different boot-up sequences and timings and/or system environments for the different control devices, these control devices may end up synchronizing with the UAV at different times. Thus, there may be an intermediate state where the UAV has established a communication with one of the multiple devices while another device of the multiple devices is still searching for the synchronization signal sent by the UAV.

In addition, when the UAV has established a communication connection with one of multiple control devices (i.e., in a "downlink" direction from the UAV to a control device), the UAV may select a downlink frequency from a larger set of available frequencies to improve communication performance. In accordance with international, national, and/or local regulatory requirements, the UAV may need to switch (or "hop") among different downlink frequencies quickly depending on their availabilities. When UAV downlink frequency hopping occurs quickly, and the set of downlink frequencies is large, it may become difficult for another device (i.e., a device still searching for the UAV's synchronization signal) to synchronize with the UAV as the UAV changes among downlink frequencies, resulting in excessive synchronization times. Further, as the UAV flies farther away from at least one of the control devices, the UAV's synchronization signal may become weaker at one of the devices such that synchronizing communications between the UAV and that device can become challenging.

The methods and systems for synchronizing multiple devices with a movable object of the present disclosure are directed towards overcoming one or more of the problems above.

SUMMARY

In one aspect, the present disclosure relates to a method for synchronizing communications between a movable object and first and second control devices. The method includes synchronizing the first control device with the movable object; synchronizing the second control device with the first control device; and synchronizing the second control device with the movable object based on the synchronization between the second control device and the first control device.

In another aspect, the present disclosure relates to a system for controlling a movable object, the system includes a first control device configured to establish synchronization with the movable object and a second control device configured to receive synchronization information from the first control device. The synchronization information is used to synchronize the second control device with the movable object.

In yet another aspect, the present disclosure relates to a non-transitory computer-readable medium containing computer-executable instructions that, when executed by a hardware processor, cause the hardware processor to perform a method for synchronizing a movable object with a first control device and a second control device, the method includes, synchronizing the first control device with the movable object, synchronizing the second control device with the first control device, and synchronizing the second control device with the movable object based on the synchronization between the second control device and the first control device.

In yet another aspect, the present disclosure relates to a method for synchronizing a movable object with a first control device and a second control device. The method includes establishing a synchronization with the first control device, and establishing a synchronization with the second control device based on a synchronization between the first control device and the second control device.

In yet another aspect, the present disclosure relates to a movable object, the movable object includes one or more processors individually or collectively configured to establish a synchronization with a first control device, and establish a synchronization with a second control device based on a synchronization between the first control device and the second control device.

In yet another aspect, the present disclosure relates to a non-transitory computer-readable medium containing computer-executable instructions that, when executed by a hardware processor, cause the hardware processor to perform a method for synchronizing a movable object with a first control device and a second control device, the method includes establishing a synchronization with the first control device, and establishing a synchronization with the second control device based on a synchronization between the first control device and the second control device.

In yet another aspect, the present disclosure relates to a method for controlling a control device. The method includes synchronizing the control device with a movable object, obtaining synchronization information based on the synchronization between the movable object and the control device, and transmitting the synchronization information.

In yet another aspect, the present disclosure relates to a control device for controlling a movable object, the control device includes one or more processors individually or collectively configured to synchronize the control device with the movable object, obtain synchronization information based on the synchronization between the movable object and the control device, and transmit the synchronization information.

In yet another aspect, the present disclosure relates to a non-transitory computer-readable medium containing computer-executable instructions that, when executed by a hardware processor, cause the hardware processor to perform a method for controlling an control device, the method includes synchronizing the control device with a movable object, obtaining synchronization information based on the synchronization between the movable object and the control device, and transmit the synchronization information.

In yet another aspect, the present disclosure relates to a method for controlling a control device, the method includes receiving synchronization information from an external device, and synchronizing the control device with a movable object based on the synchronization information.

In yet another aspect, the present disclosure relates to a control device for controlling a movable object, the control device includes one or more processors individually or collectively configured to receive synchronization information from an external device, and synchronize the control device with a movable object based on the synchronization information.

In yet another aspect, the present disclosure relates to a non-transitory computer-readable medium containing computer-executable instructions that, when executed by a hardware processor, cause the hardware processor to perform a method for controlling an control device, the method includes receiving synchronization information from an external device, and synchronizing the control device with a movable object based on the synchronization information.

DETAILED DESCRIPTION

Figure 1:
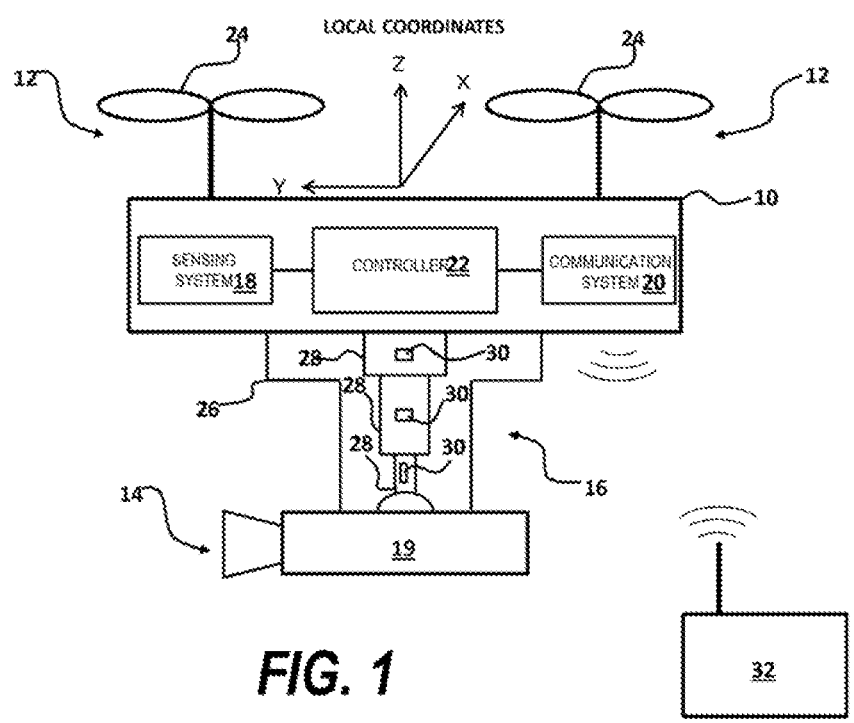
FIG. 1 is a schematic diagram of an exemplary movable object with a carrier and a payload and a control terminal consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be an unmanned aerial vehicle (UAV). Although movable object 10 is shown and described herein as a UAV for exemplary purposes of this description, it is understood that other types of movable object (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include one or more propulsion devices 12 and may be configured to carry a payload 14. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a sensing system 18, a communication system 20, and a control device 22 in communication with the other components.

Movable object 10 may include one or more (e.g., 1, 2, 3, 3, 4, 5, 10, 15, 20, etc.) propulsion devices 12 positioned at various locations (for example, top, sides, front, rear, and/or bottom of movable object 10) for propelling and steering movable object 10. Propulsion devices 12 may be devices or systems operable to generate forces for sustaining controlled flight. Propulsion devices 12 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. Each propulsion device 12 may also include one or more rotary components 24 drivably connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion devices 12 and/or rotary components 24 may be adjustable (e.g., tiltable) with respect to each other and/or with respect to movable object 10. Alternatively, propulsion devices 12 and rotary components 24 may have a fixed orientation with respect to each other and/or movable object 10. In some embodiments, each propulsion device 12 may be of the same type. In other embodiments, propulsion devices 12 may be of multiple different types. In some embodiments, all propulsion devices 12 may be controlled in concert (e.g., all at the same speed and/or angle). In other embodiments, one or more propulsion devices may be independently controlled with respect to, e.g., speed and/or angle.

Propulsion devices 12 may be configured to propel movable object 10 in one or more vertical and horizontal directions and to allow movable object 10 to rotate about one or more axes. That is, propulsion devices 12 may be configured to provide lift and/or thrust for creating and maintaining translational and rotational movements of movable object 10. For instance, propulsion devices 12 may be configured to enable movable object 10 to achieve and maintain desired altitudes, provide thrust for movement in all directions, and provide for steering of movable object 10. In some embodiments, propulsion devices 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion devices 12 may be configured to enable movement of movable object 10 along and/or about multiple axes.

Payload 14 may include one or more sensory devices 19. Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gather data that may be used to generate images. For example, imaging devices may include photographic cameras, video cameras, infrared imaging devices, ultraviolet imaging devices, x-ray devices, ultrasonic imaging devices, radar devices, etc. Sensory devices 19 may also or alternatively include devices for capturing audio data, such as microphones or ultrasound detectors. Sensory devices 19 may also or alternatively include other suitable sensors for capturing visual, audio, and/or electromagnetic signals.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15°, etc.), about one or more of its axes.

Carrier 16 may include a frame assembly 26, one or more actuator members 28, and one or more carrier sensors 30. Frame assembly 26 may be configured to couple the payload 14 to the movable object 10 and, in some embodiments, allow payload 14 to move with respect to movable object 10. In some embodiments, frame assembly 26 may include one or more sub-frames or components movable with respect to each other. Actuation members 28 may be configured to drive components of frame assembly relative to each other to provide translational and/or rotational motion of payload 14 with respect to movable object 10. In other embodiments, actuator members 28 may be configured to directly act on payload 14 to cause motion of payload 14 with respect to frame assembly 26 and movable object 10. Actuator members 28 may be or include suitable actuators and/or force transmission components. For example, actuator members 28 may include electric motors configured to provide linear or rotation motion to components of frame assembly 26 and/or payload 14 in conjunction with axles, shafts, rails, belts, chains, gears, and/or other components.

Carrier sensors 30 may include devices configured to measure, sense, detect, or determine state information of carrier 16 and/or payload 14. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 16 or payload 14 with respect to movable object 10. Carrier sensors 30 may include one or more types of suitable sensors, such as potentiometers, optical sensors, visions sensors, magnetic sensors, motion or rotation sensors (e.g., gyroscopes, accelerometers, inertial sensors, etc.). Carrier sensors 30 may be associated with or attached to various components of carrier 16, such as components of frame assembly 26 or actuator members 28, or movable object 10. Carrier sensors 30 may be configured to communicate data and information with control device 22 via a wired or wireless connection (e.g., RFID, Bluetooth, Wi-Fi, radio, cellular, etc.). Data and information generated by carrier sensors 30 and communicated to control device 22 may be used by control device 22 for further processing, such as for determining state information of movable object 10 and/or targets.

Carrier 16 may be coupled to movable object 10 via one or more damping elements configured to reduce or eliminate undesired shock or other force transmissions to payload 14 from movable object 10. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate payload 14 from movable object 10 and/or dissipate force propagations from movable object 10 to payload 14. Damping elements may also include mechanisms or devices configured to provide damping effects, such as pistons, springs, hydraulics, pneumatics, dashpots, shock absorbers, and/or other devices or combinations thereof.

Sensing system 18 may include one or more sensors associated with one or more components or other systems of movable device 10. For instance, sensing system may include sensors for determining positional information, velocity information, and acceleration information relating to movable object 10 and/or targets. In some embodiments, sensing system may also include carrier sensors 30. Components of sensing system 18 may be configured to generate data and information that may be used (e.g., processed by control device 22 or another device) to determine additional information about movable object 10, its components, or its targets. Sensing system 18 may include one or more sensors for sensing one or more aspects of movement of movable object 10. For example, sensing system 18 may include sensory devices associated with payload 14 as discussed above and/or additional sensory devices, such as a positioning sensor for a positioning system (e.g., GPS, GLONASS, Galileo, Beidou, GAGAN, etc.), motion sensors, inertial sensors (e.g., IMU sensors), proximity sensors, TOF sensors, image sensors, etc. Sensing system 18 may also include sensors or be configured to provide data or information relating to the surrounding environment, such as weather information (e.g., temperature, pressure, humidity, etc.), lighting conditions (e.g., light-source frequencies), air constituents, or nearby obstacles (e.g., objects, structures, people, other vehicles, etc.).

Communication system 20 may be configured to enable communications of data, information, commands, and/or other types of signals between control device 22 and off-board entities. Communication system 20 may include one or more components configured to send and/or receive signals, such as receivers, transmitter, or transceivers that are configured to carry out one or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communications between devices for providing input for controlling movable object 10 during flight, such as a control terminal ("terminal") 32.

Terminal 32 may be configured to receive input, such as input from a user (i.e., user input), and communicate signals indicative of the input to control device 22 via communication system 20. Terminal 32 may be configured to receive input and generate corresponding signals indicative of one or more types of information, such as control data (e.g., signals) for moving or manipulating movable device 10 (e.g., via propulsion devices 12), payload 14, and/or carrier 16. Terminal 32 may also be configured to receive data and information from movable object 10, such as operational data relating to, for example, positional data, velocity data, acceleration data, sensory data, and other data and information relating to movable object 10, its components, and/or its surrounding environment. Terminal 32 may be a remote control with physical sticks configured to control flight parameters, or may be a touch screen device, such as a smartphone or a tablet, with virtual controls for the same purposes, and may employ an application on a smartphone or a tablet, or a combination thereof. Terminal 32 may include two control devices (e.g., a first control device and a second control device). In some embodiments, at least one of the first control device and second control device is configured to control the flight of the UAV, and the other device is configured to control an imaging device of the UAV. The first control device or the second control device includes at least one of a remote controller, a smart eyeglass, a smart phone, a tablet, a watch, a virtual reality (VR) headset, or a goggle.

In some embodiments, terminal 32 may be a smart eyeglass. As used herein, the smart eyeglass may include any wearable computer glasses or other wearable item that can provide additional information to an image or scene that a wearer sees. The smart eyeglass may include an optical head-mounted display (OHMD) or embedded wireless glasses with transparent heads-up display (HUD) or augmented reality (AR) overlay that has the capability of reflecting projected digital images as well as allowing the user to see through it, or see better with it. The smart eyeglass may serve as a front end display for images, videos, and other data or information received from the movable object 10, for example, via cellular technology or Wi-Fi. In some embodiments, the smart eyeglass may also control the movable object 10 via natural language voice commands and/or use of touch buttons on the smart eyeglass.

Figure 2A:
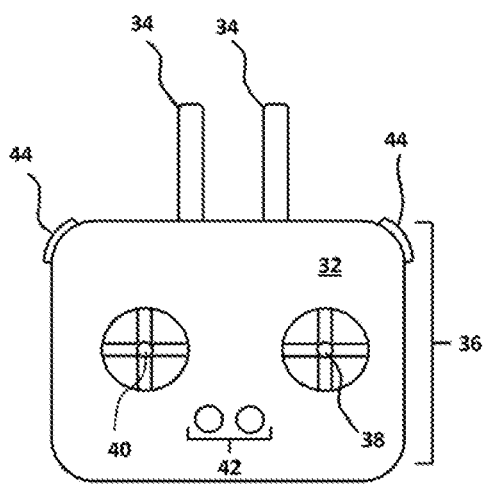
FIGS. 2A and 2B are schematic diagrams of exemplary control terminals that may be used with embodiments consistent with the present disclosure.
Figure 2B:
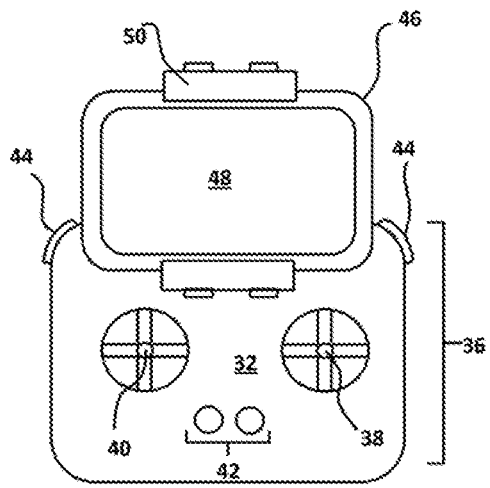

In the example shown in FIGS. 2A and 2B, terminal 32 may include communication devices 34 that facilitate communication of information between terminal 32 and other entities, such as movable object 10 or another terminal 32. Communication devices 34 may include antennae or other devices configured to send or receive signals. Terminal 32 may also include one or more input devices 36 configured to receive input from a user for communication to movable object 10. FIG. 2A shows one exemplary embodiment of terminal 32 having an input device 36 with a plurality of input devices 38, 40, 42, and 44 configured to receive user inputs indicative of desired movements of movable object 10 or its components. It is understood, however, that other possible embodiments or layouts of terminal may be possible and are within the scope of this disclosure.

Terminal 32 may include input devices, such as input levers 38 and 40, buttons 42, triggers 44, and/or other types of input devices for receiving one or more inputs from the user. Each input device of terminal 32 may be configured to generate an input signal communicable to control device 22 and usable by control device 22 as inputs for processing. In addition to flight control inputs, terminal 32 may be used to receive user inputs of other information, such as manual control settings, automated control settings, control assistance settings etc., which may be received, for example, via buttons 42 and/or triggers 44. It is understood that terminal 32 may include other or additional input devices, such as buttons, switches, dials, levers, triggers, touch pads, touch screens, soft keys, a mouse, a keyboard, a voice recognition device, and/or other types of input devices.

As shown in FIG. 2B, terminal 32 may also include a display device 46 configured to display and/or receive information to and/or from a user. For example, terminal 32 may be configured to receive signals from movable object 10, which signals may be indicative of information or data relating to movements of movable object 10 and/or data (e.g., imaging data) captured using movable object 10 (e.g., in conjunction with payload 14). In some embodiments, display device 46 may be a multifunctional display device configured to display information on a multifunctional screen 48 as well as receive user input via the multifunctional screen 48. For example, in one embodiment, display device 46 may be configured to receive one or more user inputs via multifunctional screen 48. In another embodiment, multifunctional screen 48 may constitute a sole input device for receiving user input.

In some embodiments, terminal 32 may be or include an interactive graphical interface for receiving one or more user inputs. That is, terminal 32 may be a graphical user interface (GUI) and/or include one or more graphical versions of input devices 36 for receiving user input. Graphical versions of terminal 32 and/or input devices 36 may be displayable on a display device (e.g., display device 46) or a multifunctional screen (e.g., multifunctional screen 48) and include graphical features, such as interactive graphical features (e.g., graphical buttons, text boxes, dropdown menus, interactive images, etc.). For example, in one embodiment, terminal 32 may include graphical representations of input levers 38 and 40, buttons 42, and triggers 44, which may be displayed on and configured to receive user input via multifunctional screen 48. In some embodiments, terminal 32 may be configured to receive all user inputs via graphical input devices, such as graphical versions of input devices 36. Terminal 32 may be configured to generate graphical versions of input devices 36 in conjunction with a computer application (e.g., an "app") to provide an interactive interface on the display device or multifunctional screen of any suitable electronic device (e.g., a cellular phone, a tablet, etc.) for receiving user inputs.

In some embodiments, display device 46 may be an integral component of terminal 32. That is, display device 46 may be attached or fixed to terminal 32. In other embodiments, display device may be connectable to (and disconnectable from) terminal 32. That is, terminal 32 may be configured to be electronically connectable to display device 46 (e.g., via a connection port or a wireless communication link) and/or otherwise connectable to terminal 32 via a mounting device 50, such as by a clamping, clipping, clasping, hooking, adhering, or other type of mounting device.

In some embodiments, terminal 32 may be configured to communicate with electronic devices configurable for controlling movement and/or other operational aspects of movable object 10. For example, display device 46 may be a display component of an electronic device, such as a cellular phone, a tablet, a personal digital assistant, a laptop computer, or other device. In this way, users may be able to incorporate the functionality of other electronic devices into aspects of controlling movable object 10, which may allow for more flexible and adaptable control schemes to be used. For example, terminal 32 may be configured to communicate with electronic devices having a memory and at least one processor, which control devices may then be used to provide user input via input devices associated with the electronic device (e.g., a multifunctional display, buttons, stored apps, web-based applications, etc.). Communication between terminal 32 and electronic devices may also be configured to allow for software update packages and/or other information to be received and then communicated to control device 22 (e.g., via communication system 20).

It is noted that other control conventions that relate inputs received via terminal 32 to desired or actual movements of movable device 10 may be used, if desired.

Figure 3:
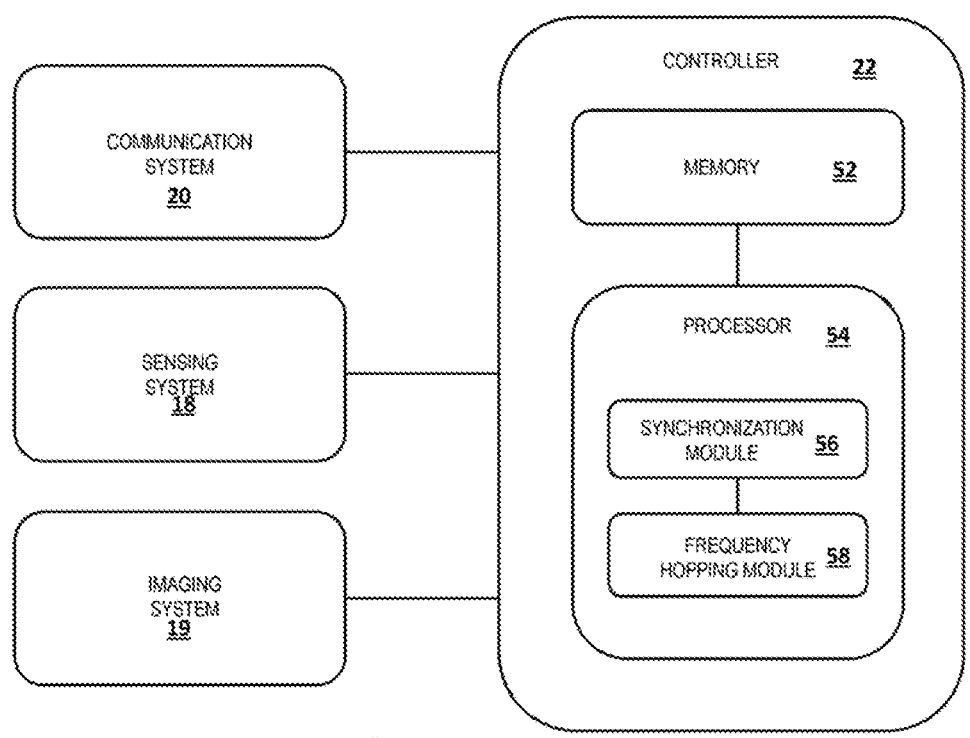
FIG. 3 is a schematic diagram of an exemplary control device that may be used with embodiments of the present disclosure.

As shown in FIG. 3, control device 22 may include one or more components, for example, a memory 52 and at least one processor 54. Memory 52 may be or include at least one non-transitory computer readable medium and can include one or more memory units of non-transitory computer-readable medium. Non-transitory computer-readable medium of memory 52 may be or include any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Information and data from sensing system 18 may be communicated to and stored in non-transitory computer-readable medium of memory 52. The computer-readable medium associated with memory 52 may also be configured to store logic, code and/or program instructions executable by processor 54 to perform any suitable embodiment of the methods described herein. For example, the computer-readable medium associated with memory 52 may be configured to store computer-readable instructions that, when executed by processor 54, cause the processor to perform a method comprising one or more steps. The method performed by the processor based on the instructions stored in the non-transitory computer readable medium may involve processing inputs, such as inputs of data or information stored in the non-transitory computer-readable medium of memory 52, inputs received from terminal 32, inputs received from sensing system 18 (e.g., received directly from sensing system or retrieved from memory), and/or other inputs received via communication system 20. The non-transitory computer-readable medium may be configured to store sensing data from the sensing system to be processed by the processing. In some embodiments, the non-transitory computer-readable medium can be used to store the processing results produced by the processing.

In this exemplary embodiment of FIG. 3, the sensory device 19 may be an imaging system 19. In this disclosed embodiment, imaging system 19 may include imaging devices configured to gather data that may be used to generate images for surveying, tracking, and capturing images or video of targets (e.g., objects, landscapes, subjects of photo or video shoots, etc.). For example, imaging devices may include photographic cameras, video cameras, infrared imaging devices, ultraviolet imaging devices, x-ray devices, ultrasonic imaging devices, radar devices, etc. In this exemplary embodiment, the imaging device may be configured to generate optical data of the target for identifying and tracking the target. For example, the imaging device may be an optical device, such as a camera or video camera. The imaging device may be configured to generate imaging data indicative of one or more features of the target. The imaging system 19 may further be configured to communicate data (e.g., image frames) and information with control device 22 via a wired or wireless connection (e.g., RFID, Bluetooth, Wi-Fi, radio, cellular, etc.). Data and information generated by imaging system 19 and communicated to control device 22 may be used by control device 22 for further processing.

Processor 54 may include one or more processors and may embody a programmable processor, e.g., a central processing unit (CPU). Processor 54 may be operatively coupled to memory 52 or another memory device configured to store programs or instructions executable by processor 54 for performing one or more method steps. It is noted that method steps described herein may be stored in memory 52 and configured to be carried out by processor 54 to cause the method steps to be carried out by the processor 54.

In some embodiments, processor 54 may include and/or alternatively be operatively coupled to one or more control modules, such as a synchronization module 56 and a frequency hopping module 58, which will be explained in greater detail below. The synchronization module 56 may be configured to control methods of operating synchronization between the movable object 10 and one or more terminals 32, such as by broadcasting a pilot sequence carried over a frequency selected from a frequency set, receiving a synchronization signal from the one or more terminals 32, performing frame timing synchronization and/or carrier synchronization between the movable object 10 and the one or more terminals 32, and establishing a communication between the movable object 10 and the one or more terminals 32. As used herein, "a frequency set" refers to a predefined set of frequencies from which a particular frequency may be selected. A frequency set generally may include a fixed or variable set of frequencies.

The frequency hopping module 58 may be configured to switch between frequencies in a frequency set after synchronizing the movable object 10 with one of the one or more terminals 32, and to switch to a different frequency quickly to improve communication performance and/or in accordance with international, national, and local regulations. The synchronization module 56 and the frequency hopping module 58 may be implemented in software for execution on processor 54, or may be implemented in hardware and/or software components separate from processor 54 (not shown in the figure).

Processor 54 can be operatively coupled to the communication system 20 and be configured to transmit and/or receive data from one or more external devices (e.g., terminal 32, display device 46, or other remote controller). Any suitable means of communication can be used to transfer data and information to or from control device 22, such as wired communication or wireless communication. For example, communication system 20 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication system 20 can transmit and/or receive one or more of sensing data from the sensing system 18, processing results produced by the processor 54, predetermined control data, user commands from terminal 32 or a remote controller, and the like.

The components of control device 22 can be arranged in any suitable configuration. For example, one or more of the components of the control device 22 can be located on the movable object 10, carrier 16, payload 14, terminal 32, sensing system 18, or an additional external device in communication with one or more of the above. In some embodiments, one or more processors or memory devices can be situated at different locations, such as on the movable object 10, carrier 16, payload 14, terminal 32, sensing system 18, additional external device in communication with one or more of the above, or suitable combinations thereof, such that any suitable aspect of the processing and/or memory functions performed by the system can occur at one or more of the aforementioned locations.

In accordance with the disclosed embodiments, point-to-multipoint communications may be desired, such as communications between a movable object (e.g., UAV) and multiple terminals 32 (e.g., two control devices or other control devices), or between the UAV and at least one terminal 32 and a smart eyeglass. Further to various exemplary embodiments, systems and methods are provided to synchronize communications between a UAV and multiple devices. Such systems and methods may overcome conventional synchronization difficulties in point-to-multipoint communications between a UAV and multiple devices. For example, rather than each control device separately synchronizing with the UAV, according to embodiments disclosed herein a first control device may synchronize with the UAV, then other control devices may synchronize with the UAV based on the first control device's synchronization with the UAV. In addition, since the multiple control devices may be in relatively close proximity to each other, the disclosed methods and systems may overcome the problem that direct synchronization with the UAV can become difficult as the UAV flies farther away from a control device causing much lower received signal power at that control device.

Figure 4:
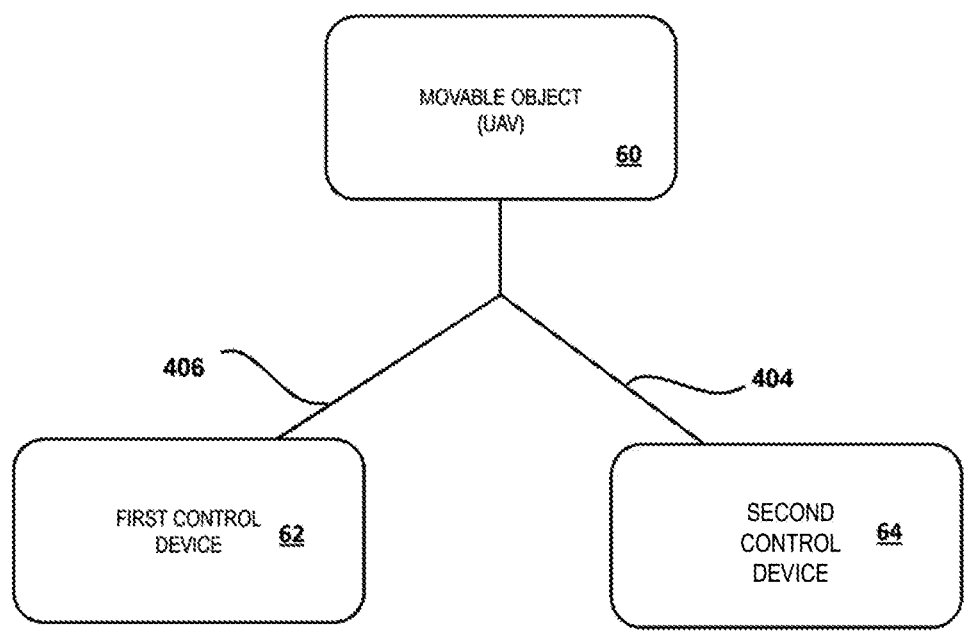
FIG. 4 is a schematic diagram of an exemplary system in which a movable object communicates with multiple devices consistent with embodiments of the present disclosure.

In the exemplary embodiment of FIG. 4, a system may include a first control device 62 and a second control device 64. In alternative embodiments, the system may include the first control device 60, the first control device 62, and the second control device 64. The movable object 60 may need to establish point-to-multipoint communications with the two control devices 62, 64, as shown by lines 404, and 406. In the point-to-multipoint communications for the UAV, the two control devices may be located close to each other. This allows the system to have some of the following characteristics. First, a wave path difference between a wave path from the movable object 60 to the first control device 62 and a wave path from the movable object 60 to the second control device 64 may be relatively small. As such, when one of the two control devices (e.g., the first control device 62) has established synchronization with the movable object 60, the other device (the second control device 64) may indirectly establish synchronization with the movable object 60 if the other device established synchronization with the first control device that has already established synchronization with movable object 60. In addition, since the first control device 62 has already achieved frame timing synchronization and carrier synchronization with the movable object 60, the second control device 64 also may indirectly achieve frame timing synchronization and carrier synchronization with the movable object 60 after the first control device 62 and the second control device 64 establish synchronization. Second, since the distances from movable object 60 to both the first control device and the second control device are almost same, the power received by the two control devices 62 and 64 from the movable object 60 also would be almost the same. As such, automatic gain control (AGC) value for receiving signals from the movable object 60 may be similar for the two control devices 62 and 64. Third, since the two control devices may be relatively close to each other, signals transmitted between the two control devices may have a high signal-to-noise ratio. In this manner, it is relatively easy for one of the two control devices to detect a signal transmitted by the other control device.

For example, assuming the first control device 62 has synchronized with the movable object 60 and the second control device 64 has not yet established synchronization with the movable object 60, according to the first characteristic above, frame timing synchronization and carrier synchronization between the second control device 64 and the movable object 60 may be determined based on timing synchronization and carrier synchronization between the second control device 64 and the first control device 62. In accordance with the second characteristic above, an AGC value for the second control device may be set as the AGC value used by the first control device. Further, based on characteristic three above, the second control device 64 may acquire, via the first control device 62, frequency, frequency bandwidth of the movable object 60, and AGC value of the first control device 62. Due to the close distance between the two control devices, the second control device 64 may still have access to this information for synchronizing with the movable object 60 at a higher channel quality even when the movable object 60 has travelled far from the second control device 64.

In the exemplary embodiment in FIG. 4, after the movable object 60 is powered on, the movable object 60 broadcasts a synchronization signal (e.g., a pilot sequence) carried over a frequency in or otherwise associated with a fixed or variable frequency set (referred as S0). The two control devices 62, 64 respectively attempt to synchronize with the movable object 60 based on the synchronization signal after powering on. When one of the two control devices (e.g., the first control device 62) establishes synchronization with the movable object 60, for example, the first control device 62 achieves frame timing synchronization and carrier synchronization with the movable object 60. As such, the first control device 62 and the movable object 60 may establish communications, after which, the frequency used by the movable object 60 to communicate with the first control device 62 may not be limited in S0. In order to meet the requirements of compliance regulations and/or for better communication quality by adaptively selecting frequency, the movable object 60 may hop among a plurality of frequencies to communicate with the first control device 62. In this scenario, the second control device 64 may not be able to directly synchronize with the movable object 60. In order to facilitate the synchronization of the second control device 64 with the movable object 60, the first control device 62, which has been synchronized with the movable object 60, periodically or aperiodically broadcasts or otherwise transmits synchronization information, e.g., at a fixed system time point, over a frequency set S1. The synchronization information may at least one of the following: the current frequency used by the movable object 60, the current frequency bandwidth used by the movable object 60, the AGC value used by the first control device 62, and/or any other necessary information.

The second control device 64 attempts to demodulate the synchronization information transmitted from the first control device 62 in the frequency set S1 in addition to attempting to synchronize directly with the movable object 60. When the second control device 64 receive the synchronization information transmitted from the first control device 62, the second control device 64 obtains frame timing synchronization and carrier synchronization with the first control device 62. Since the first control device 62 has been synchronized with the movable object 60 (achieved frame timing synchronization and carrier synchronization), the second control device 64 may be synchronized indirectly with the UAV (i.e., acquiring frame timing synchronization and carrier synchronization). In this embodiment, the second control device 64 may demodulate the current frequency and the current frequency bandwidth of the movable object 60, and AGC value of the first control device 62 from the synchronization information to adjust the frequency (e.g., receiving frequency), the frequency bandwidth (e.g., the receiving frequency bandwidth) and the AGC value of the second control device 64, such that downlink data of the movable object 60 can be demodulated by the second control device 64, and the second control device 64 may establish synchronization with the movable object 60. It should be noted that the term "downlink" may indicate the datalink establish by a movable object to transmit data to a control device.

Figure 5:
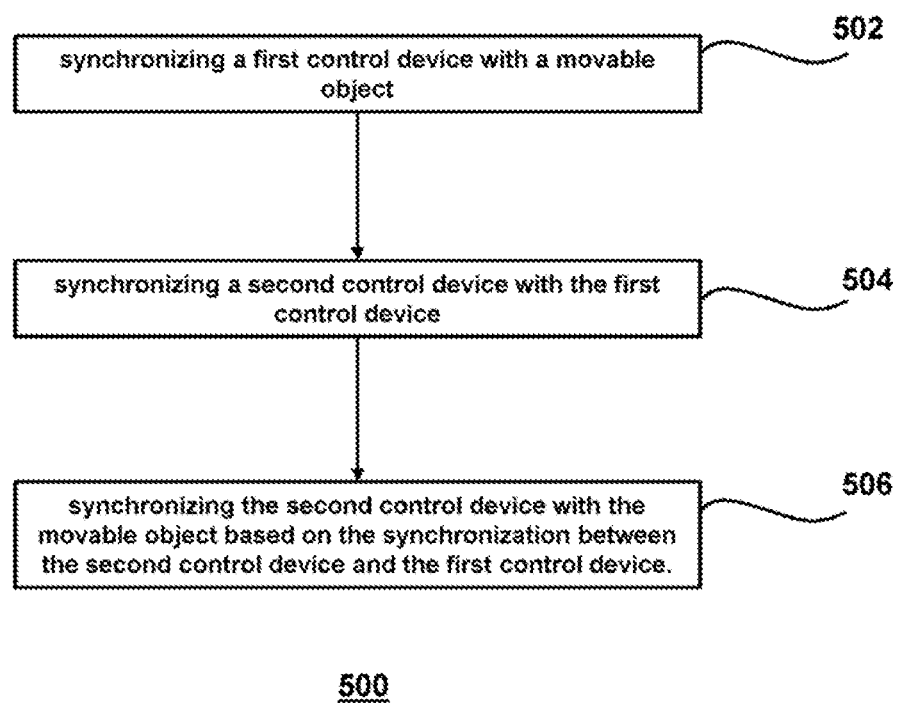
FIG. 5 is a flow chart of an exemplary method of synchronizing a movable object with multiple devices consistent with embodiments of the present disclosure.

FIG. 5 shows an exemplary method 500 of synchronizing a movable object (e.g., a UAV) with multiple control devices for communicating between the UAV and the multiple control devices in accordance with the disclosed embodiments. As used herein, the multiple devices may be one or more terminal 32 as shown in FIGS. 2A and 2B, for example, one or more control devices for controlling the UAV, and/or one or more smart eyeglass for controlling and communicating with the UAV. The exemplary method 500 will be described in view of the above system shown in FIG. 4, but the implementation of the method 500 is not limited to the system in FIG. 4.

Figure 6A:
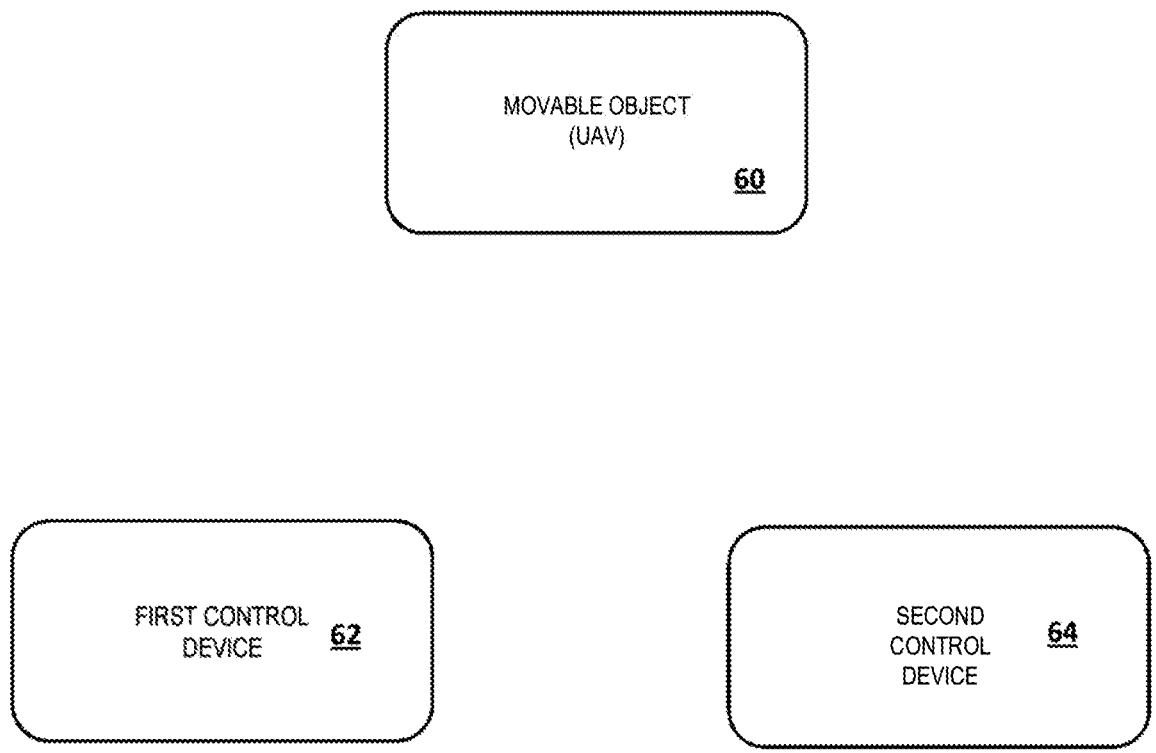
FIG. 6A is a schematic diagram of an exemplary system in which a movable object has not synchronized with multiple devices consistent with embodiments the present disclosure.
Figure 6B:
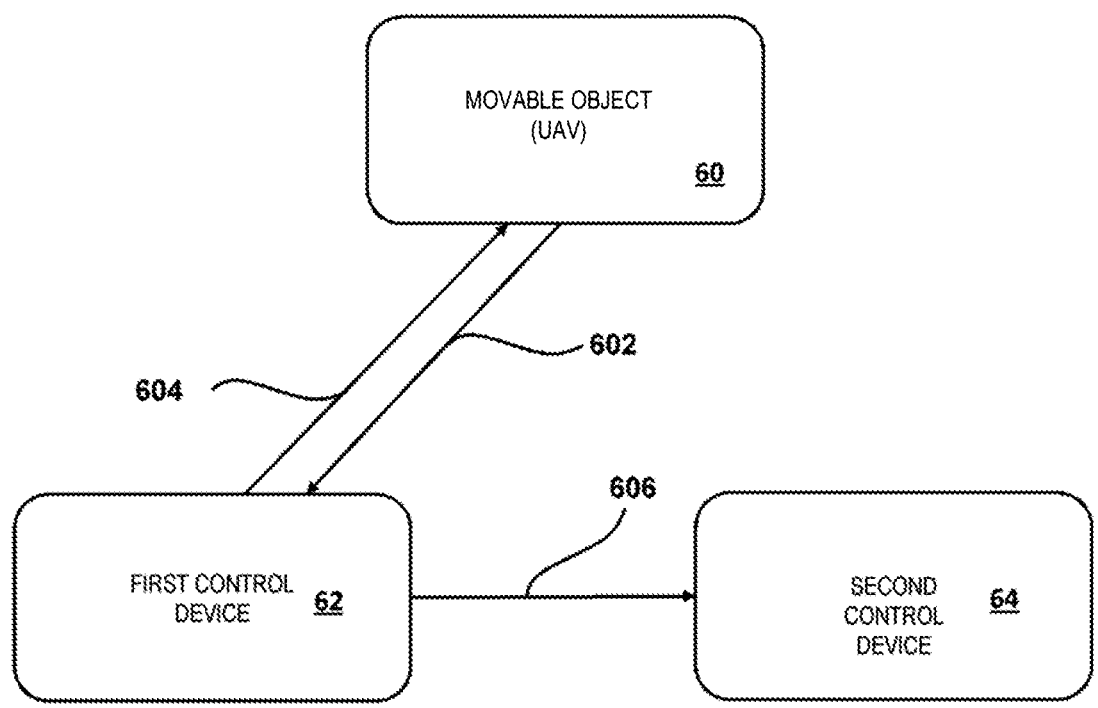
FIG. 6B is a schematic diagram of the exemplary system of FIG. 6A, in which a first control device synchronizes with the movable object, consistent with embodiments of the present disclosure.

In step 502, a first control device of the multiple devices is synchronized with a movable object. Initially, both the first control device 62 and the second control device 64 are not synchronized with the movable object 60, as shown in FIG. 6A where no datalinks are established between the movable object 60 and the two control devices 62, 64. After being powered on, the movable object 60 broadcasts a pilot sequence on a frequency in or associated with a fixed or variable frequency set S0, the frequency set S0 may include a plurality of frequencies. The frequency which is used to broadcast the pilot sequence by the movable object 60 may hop among the plurality of the downlink frequencies. After the two control devices 62, 64 are switched on, they may try to synchronize with the movable object 60. The first control device 62, for example, monitors and detects the pilot sequence, e.g., in the fixed or variable frequency set S0, and achieve synchronization with the movable object 60 first. Thus, frame timing synchronization and carrier synchronization between the movable object 60 and the first control device 62 are established and normal communication process between the movable object 60 and the first control device 62 is established, as shown in FIG. 6B where lines 602 and 604 indicate the normal communication process. The first control device may obtain synchronization information based on the synchronization between the first control device and the movable object. The synchronization information may include at least one of the movable object's downlink frequency, downlink frequency bandwidth, or AGC value that is used by the first control device 62 and may also include other information.

In step 504, synchronizing a second control device with the first control device is performed. After synchronizing with the movable object 60, the first control device 62 may periodically or aperiodically (e.g., every time period TO) broadcast synchronization information on a frequency in a frequency set S1. The synchronization information may include at least one of the movable object's downlink frequency, downlink frequency bandwidth, or AGC value that is used by the first control device 62 and may also include other information. In addition to attempting to synchronize with the movable object 60 directly, the second control device 64 may try to synchronize with the first control device 62 at the frequency set S1 by receiving the synchronization information transmitted by the first control device 62. Accordingly, frame timing synchronization and carrier synchronization between the second control device 64 and the first control device 62 are established, as indicated by line 606 in FIG. 6B.

Figure 6C:
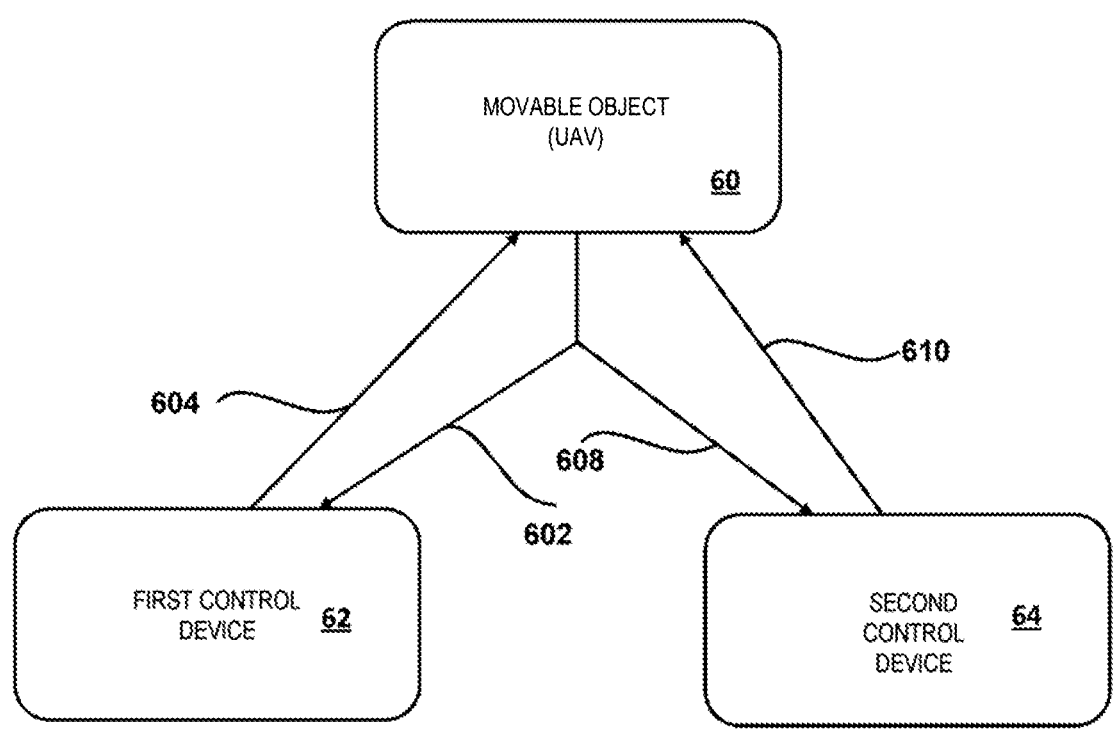
FIG. 6C is a schematic diagram of the exemplary system of FIG. 6A, in which the movable object synchronizes with both the first control device and a second control device consistent with embodiments of the present disclosure.

In step 506, the second control device is synchronized with the movable object based on the synchronization between the second control device and the first control device. The second control device 64 may demodulate the synchronization information transmitted from the first control device 62 to retrieve the movable object's downlink frequency, downlink frequency bandwidth, or AGC value that is used by the first control device 62. The second control device 64 adjusts its receiving frequency and receiving frequency bandwidth to the movable object's downlink frequency, downlink frequency bandwidth according to instructions in the synchronization information and uses the AGC value of the synchronization information, so that downlink data (e.g., image data) sent by the movable object 60 may be demodulated. Accordingly, the second control device 64 is synchronized with the movable object 60. A normal communication between the second control device 64 and the movable object 60 may then be established as indicated by lines 608 and 610 shown in FIG. 6C.

In some embodiments, when the second control device 64 established synchronization with the movable object 60, the second control device may transmit synchronization information. For example, the control device may periodically or aperiodically transmit the synchronization information to one or more external devices (e.g., one or more other control devices) in a frequency set, the frequency set may include a plurality of frequencies.

Figure 7:
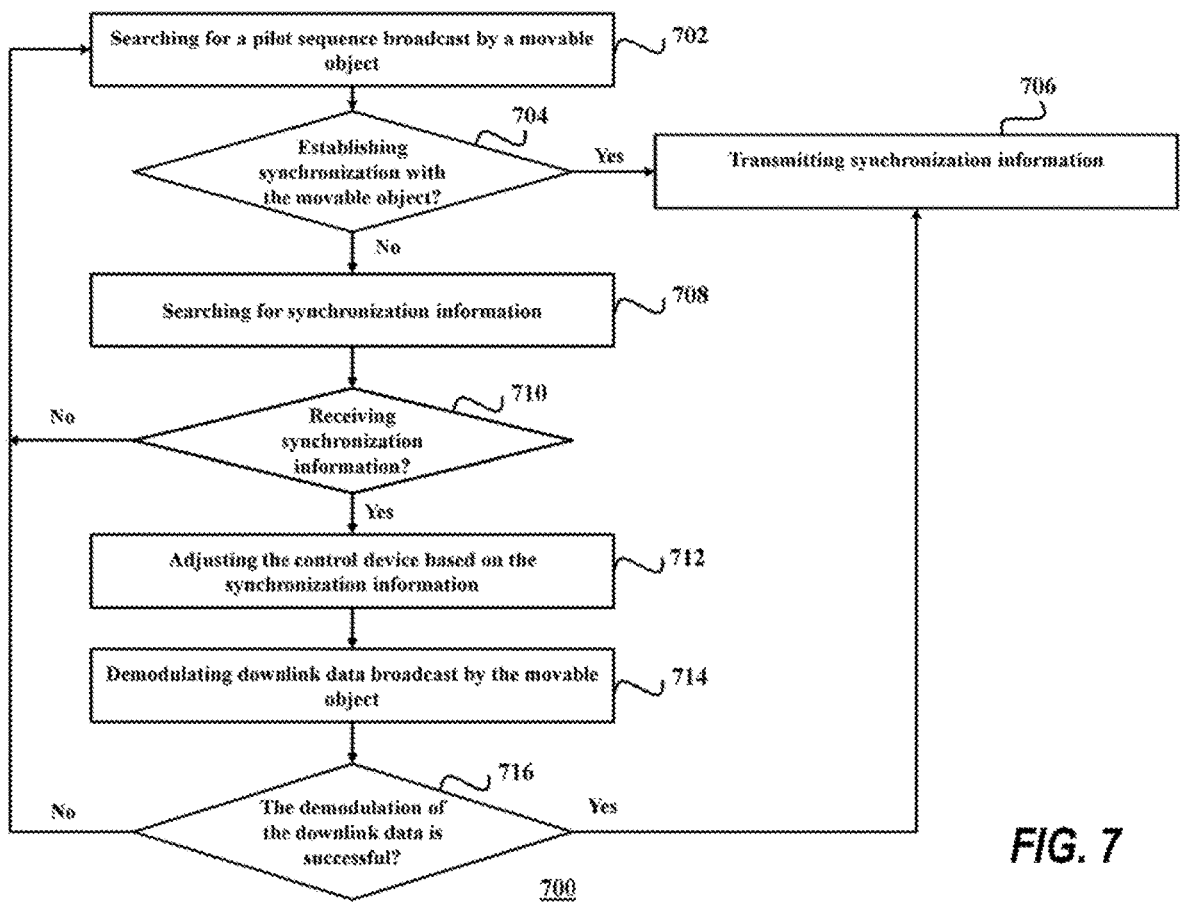
FIG. 7 is a flow chart of an exemplary method for synchronizing multiple devices with a movable object consistent with embodiments of the present disclosure.

FIG. 7 shows an exemplary method of controlling a control device in accordance with some embodiments of the present disclosure. It should be noted that the method 700 disclosed in FIG. 7 may be used by the control device to establish synchronization with a movable object, it may also be used by the control device to reestablish synchronization with the movable object when the control device loses synchronization with the movable object.

In step 702, searching for a pilot sequence broadcast by a movable object may be performed. In some embodiments, the control device (e.g., the control device 62 or the control device 64) may search for a pilot sequence broadcast by the movable object (e.g., the movable object 60). The search of the pilot sequence may be performed by the control device in a frequency set, the frequency set may include a plurality of frequencies. The frequency used by the movable object to broadcast the pilot sequence may hop among the plurality of frequencies. The frequency set may also include one or more frequency bandwidths, the one or more bandwidths may correspond the plurality of frequencies. The frequency set may either be fixed or variable.

In step 704, whether the synchronization between the control device and the movable object is established is determined. When the control device establishes synchronization with the movable object, the control device may establish frame timing synchronization and carrier synchronization with the movable object, and the control device may also establish datalinks with the movable object. The control device may be capable of receiving data transmitted by the movable object via the datalink, the control device may also be capable of transmitting data to the movable object via the datalink. For example, the control device may receive image data captured by the movable object via the datalink, the control device may transmit controlling command to the movable object via the datalink to control the flight of the movable object or control an imaging device (e.g., a camera) of the movable object. In some embodiments, the control device may obtain synchronization information based on the synchronization between the control device and the movable object. The synchronization information may include at least one of the movable object's downlink frequency, downlink frequency bandwidth, or AGC value that is used by the first control device 62 and may also include other information.

In step 706, transmitting synchronization information is performed by the control device. In some embodiments, when the control device established synchronization with the movable object, the control device may transmit synchronization information. For example, the control device may periodically or aperiodically transmit the synchronization information to one or more external devices (e.g., one or more other control devices) in a frequency set, the frequency set may include a plurality of frequencies. The frequency used by the control device to transmit the synchronization information may hop among the plurality of frequencies. The frequency set may also include one or more frequency bandwidths, the one or more bandwidths may correspond the plurality of frequencies. The frequency set may either be fixed or variable.

The synchronization information may include at least one of a frequency, a frequency bandwidth used by the movable object, or an AGC value used by the control device.

In step 708, when the control device fails to establish synchronization with the movable object, the control device may search for synchronization information transmitted by one or more external devices. In some embodiments, an external device may transmit synchronization information when the external device establishes synchronization with the movable object. The synchronization information may include at least one of a frequency, a frequency bandwidth used by the movable object, or an AGC value used by the external device. The synchronization information may be used by the control device to establish synchronization with the movable object.

In step 710, whether the synchronization information is received is determined. In some embodiments, the control device may establish synchronization with the external device. Further, the control device may establish frame timing synchronization and carrier synchronization with the external device. The control device may establish datalinks with the external device. The control device may be capable of receiving synchronization information transmitted by the external device. The synchronization information may include at least one of a frequency, a frequency bandwidth used by the movable object, or an AGC value used by the external device. If the control device fails to receive the synchronization, the control device may search for a pilot sequence broadcast by the movable object. In alternative embodiments, when the control device fails to receive the synchronization information, the control device may continue to search for the synchronization information.

In step 712, adjusting the control device based on the synchronization information may be performed. As mentioned elsewhere in the present disclosure, the synchronization information may include at least one of a frequency, a frequency bandwidth used by the movable object, or an AGC value used by the external device. The control device may be capable to demodulate the at least one of the frequency, the frequency bandwidth used by the movable object, or the AGC value used by the external device. In some embodiments, the control device may adjust its receiving frequency and receiving frequency bandwidth based on the frequency and the frequency bandwidth of the synchronization information used by the movable object, and adjust its AGC value based on the AGC value of the synchronization information used by the external device.

In step 714, demodulating downlink data broadcast by the movable object may be performed. In some embodiments, the control device may be capable of establishing synchronization with the movable object after setting its receiving frequency, receiving frequency bandwidth, and AGC value based on the frequency and the frequency bandwidth of the synchronization information used by the movable object, and the AGC value of the synchronization information used by the external device. When the control device established synchronization with the movable object, the control device may be capable of demodulating downlink data (e.g., image data) broadcast by the movable object.

In step 716, whether the demodulation of the downlink data is successful is determined. In some embodiments, when the control device demodulates the downlink data broadcast by the movable object, the control device may transmit synchronization information. For example, the control device may periodically or aperiodically transmit synchronization information to one or more external devices in a frequency set, the frequency set may include a plurality of frequencies. The frequency used by the control device to transmit the synchronization information may hop among the plurality of frequencies. The frequency set may also include one or more frequency bandwidths, the one or more bandwidths may correspond the plurality of frequencies. The frequency set may either be fixed or variable. The synchronization information may include at least one of a frequency, a frequency bandwidth used by the movable object, or an AGC value used by the control device.

In some embodiments, when the control device fails to demodulate the downlink data broadcast by the movable object. The control device may search for a pilot sequence broadcast by the movable object. In alternative embodiments, the control device may continue to search for synchronization when the control device fails to demodulate the downlink data broadcast by the movable object.

It should be noted that the flowchart described above is merely provide for the purposed of illustration, and not intend to limit the scope of the present disclosure. For persons having ordinary skills in the art, various variations and modifications can be conceptualized and reduced into practice in the light the teaching disclosed in the present disclosure. However, the variations and modifications may not depart from the scope of the present disclosure. For example, the method 700 may be used to synchronize a first control device and a second control device with a UAV. The first control device may establish synchronization with the UAV based on the synchronization between the second control device and the UAV, or vice versa. The first control device may control the flight of the UAV while the second control device may control an imaging device of the UAV, or vice versa.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A method of synchronizing a movable object with a first control device and a second control device, the method comprising:
   synchronizing the first control device with the movable object;
   synchronizing the second control device with the first control device, wherein the second control device is configured to receive synchronization information; and
   synchronizing the second control device with the movable object based on the synchronization between the second control device and the first control device,
   wherein synchronizing the second control device with the movable object based on the synchronization between the second control device and the first control device comprises:
      demodulating, by the second control device, the synchronization information to retrieve at least one of a downlink frequency or a downlink frequency bandwidth of the movable object; and
      adjusting at least one of a receiving frequency or a receiving frequency bandwidth of the second control device according to the at least one of the downlink frequency or the downlink frequency bandwidth of the movable object retrieved from the synchronization information,
   wherein the demodulating further comprises:
      demodulating an automatic gain control value of the movable object from the synchronization information.

2. The method of claim 1, further comprising:
   transmitting, by the first control device, the synchronization information.

3. The method of claim 1, wherein synchronizing the first control device with the movable object comprises:
   synchronizing the first control device with the movable object based on a pilot sequence broadcast by the movable object.

4. The method of claim 1, wherein at least one of the first control device or the second control device includes at least one of a remote controller, a smart eyeglass, a smart phone, a tablet, a watch, a virtual reality (VR) headset, or a goggle.

5. The method of claim 1, wherein the movable object comprises an unmanned aerial vehicle.

6. A system for controlling a movable object, the system comprising:
   a first control device configured to establish synchronization with the movable object; and
   a second control device configured to receive synchronization information from the first control device;
   wherein the synchronization information is used to synchronize the second control device with the movable object, and
   wherein the second control device is further configured to:
      demodulate the synchronization information to retrieve at least one of a downlink frequency or a downlink frequency bandwidth of the movable object; and
      adjust at least one of a receiving frequency or a receiving frequency bandwidth of the second control device according to the at least one of the downlink frequency or the downlink frequency bandwidth of the movable object retrieved from the synchronization information,
   wherein the second control device is further configured to demodulate an automatic gain control value from the synchronization information.

7. The system of claim 6, wherein the first control device is further configured to:
obtain the synchronization information based on the synchronization with the movable object.

8. The system of claim 6, wherein the first control device is further configured to:
receive a pilot sequence broadcast by the movable object; and
establish the synchronization with the movable object based on the pilot sequence.

9. The system of claim 6, wherein the second control device is further configured to establish synchronization with the first control device.

10. The system of claim 6, wherein at least one of the first control device or the second control device includes at least one of a remote controller, a smart eyeglass, a smart phone, a tablet, a watch, a virtual reality (VR) headset, or a goggle.

11. The system of claim 6, wherein the movable object comprises an unmanned aerial vehicle.

12. The system of claim 6, wherein the first control device is configured to control a flight of the movable object, and the second control device is configured to control an imaging device of the movable object, or vice versa.

\* \* \* \* \*